Oct. 11, 1966  NAGATOMO MASAHARU  3,278,784
LIGHT PRODUCING FORMATION COMPRISING LUMINESCENT
ELECTRICALLY EXCITABLE FIBERS
Filed Dec. 3, 1962  2 Sheets-Sheet 2
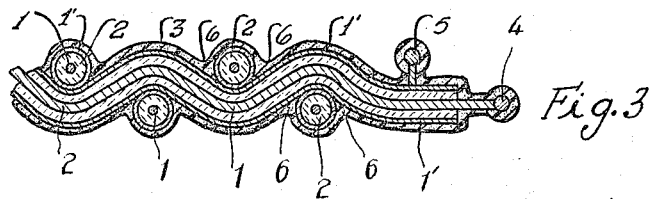
Fig. 3
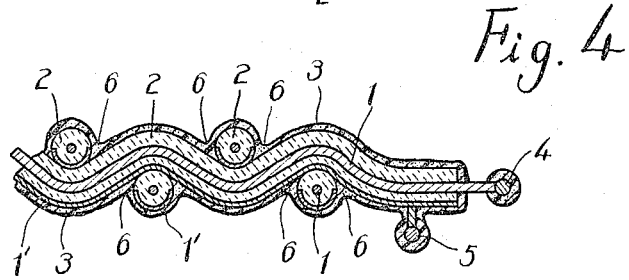
Fig. 4
Fig. 5
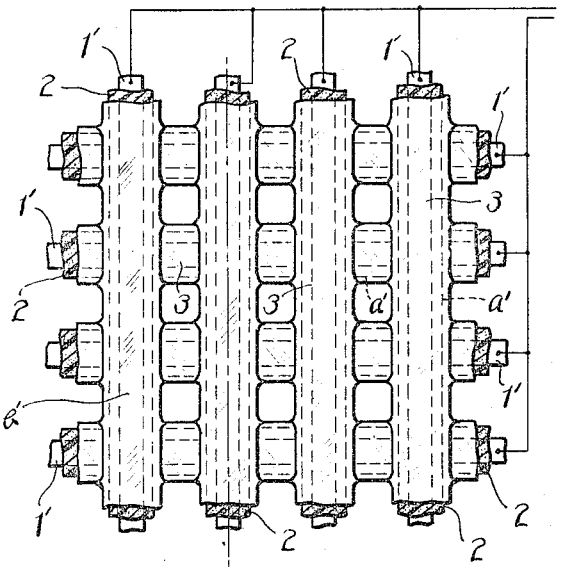
Fig. 6
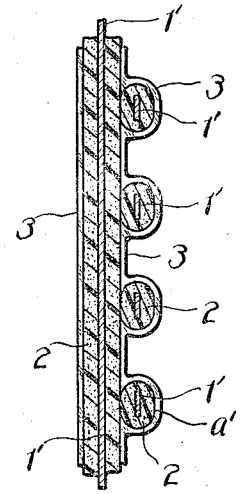
Fig. 7
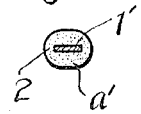
INVENTOR.
NAGATOMO MASAHARU
BY McGlew and Toren
Attorneys $$\text{3,278,784}$$
Patented Oct. 11, 1966

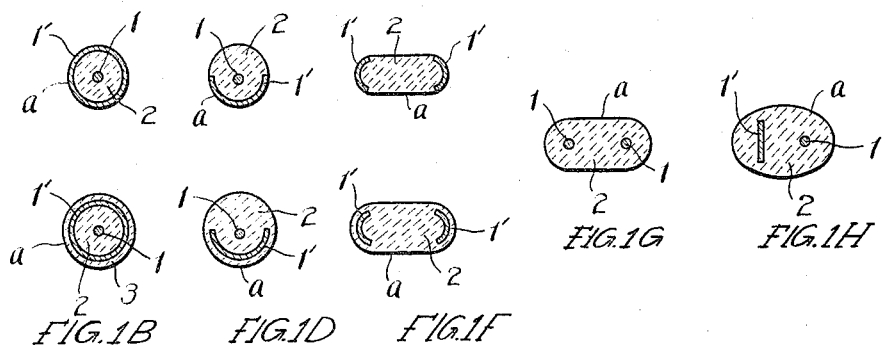
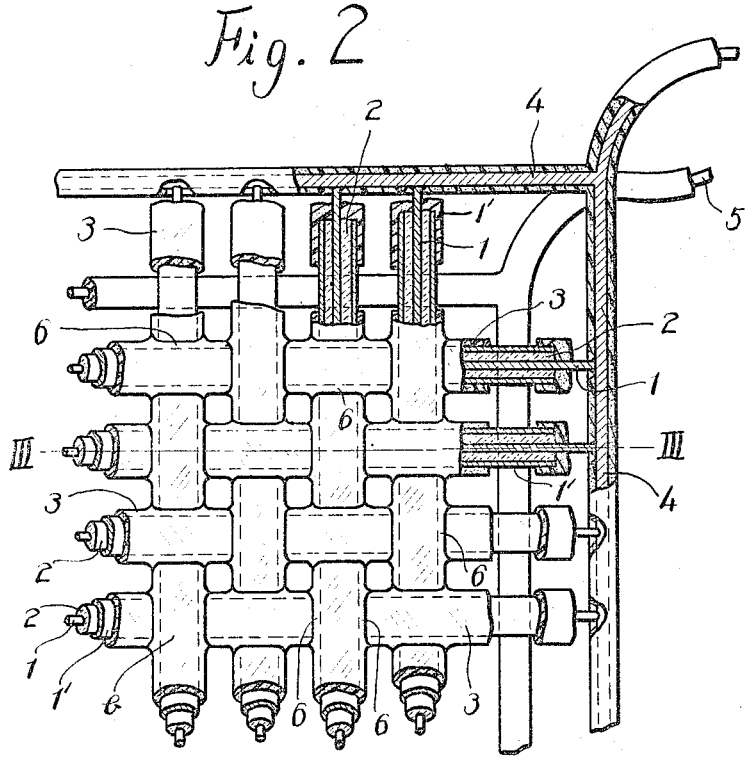

---

3,278,784
LIGHT PRODUCING FORMATION COMPRISING LUMINESCENT ELECTRICALLY EXCITABLE FIBERS
Nagatomo Masaharu, 245 Oaza Ogushi, Ube, Yamaguchi-ken, Japan
Filed Dec. 3, 1962, Ser. No. 241,807
Claims priority, application Japan, Dec. 11, 1961, 36/44,709
8 Claims. (Cl. 313—108)

This invention pertains, in general, to light sources; and, in particular, to light sources comprising flexible, fiber-like or strip-like members which become luminescent when electrically excited to produce light.

One object of the present invention is to provide a new and useful light source.

Another object of the present invention is to provide a flexible, fiber-like or strip-like light source from which a light producing fabric can be made by employing the conventional fabric producing techniques known in the textile arts.

Another object of the invention is to provide a light source which may be formed into any desired shape, configuration or pattern.

Another object of the present invention is to provide flexible, fiber-like or strip-like multicolored light sources.

According to one embodiment of the invention there is provided a fabric woven from flexible fibers or strips. Each of the fibers or strips has a pair of spaced-apart flexible electrodes embedded in a dielectric luminescent material. The nature of the luminescent material used is such that it is flexible.

One feature of the invention is the employment of a different luminescent material in any one fibrous light source to enable the one light source to emit a multi-colored light pattern.

Another feature of the invention is the employment of different luminescent materials in different fibrous light sources so that the fabric woven from the different fibers or strips produces a predetermined multi-colored light pattern.

Another feature of the invention is the employment of electrodes of different shapes so that the fiber-like or strip-like light sources provide different radiated light intensities at different portions of the peripheries of the fibrous strips.

Another feature of the invention is the provision of fibrous or strip-like light sources containing but one electrode, said strips being arranged in a cross point array and electrically energized through their single electrodes to provide a large light radiating surface.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIGS. 1A–1H are cross sections of different fiber-like, or strip-like, light sources according to the present invention;

FIG. 2 is a plan view, partly sectioned, of a large-area light source which is in the form of a fabric woven from fiber-like or strip-like light sources;

FIG. 3 is a sectional view of the fabric of FIG. 2 as taken along the lines III—III of FIG. 2;

FIG. 4 is a sectional view similar to the sectional view of FIG. 3 except that different fibrous light sources are used;

FIG. 5 is a plan view, partly sectioned, of a large-area light source which is formed by arranging fiber or strip-like light sources in a cross point array, or lattice;

FIG. 6 is a sectional view of the light source of FIG. 5 as taken along a vertical line through any row or columnar fiber array shown in FIG. 5; and, FIG. 7 is a cross-sectional view of the single electrode fiber or strip-like light source employed in the large area light source shown at FIGS. 5 and 6.

FIGS. 1A through 1H are illustrations of the various cross-sectional forms in which the light producing fibers or strips $a$ can be made. (FIG. 7 is an additional illustration showing another cross-sectional form of a single electrode light producing fiber or strip $a'$.)

At FIG. 1A the light producing fiber or strip $a$ is comprised of two coaxially arranged electrodes 1 and 1'. Intermediate the first electrode 1 and the second electrode 1' there is situated electro-luminescent material 2. The first electrode 1 is a filamentary flexible wire of electrically conductive material such as copper, or the like. Encompassing the first electrode is a flexible luminescent material 2 such as ZnS. Flexible insulation material can be added such as Teflon resin to serve as a matrix for the fluorescent material 2 which is advantageously in granular form. By selecting the appropriate luminescent material two different colors of light can be radiated from the fiber or strip $a$.

Two alternative electrical construction forms of the fiber, or strip, $a$ may be employed: (1) granular, or small crystals of any one, or more, of the luminescent or electro-luminescent materials 2, hereinbefore mentioned, may be situated between the electrodes 1, 1'—1, 1—1', 1'. These electrodes can be coated with an insulating membrane such as $SnO_2$; (2) the luminescent material can be embedded in a flexible matrix of Teflon resin, or the like. With such construction forms the luminescent material can be subjected to an electric field to cause the material to become luminescent.

Coaxially surrounding the filamentary electrode 1 and the luminescent material 2 is a thin, flexible tubular electrode 1' which is formed from an electrically conductive material such as copper or the like. In the form of the light producing fiber, or strip, $a$ shown in FIG. 1A it will be appreciated that light will emanate only from the cross-sectional ends of the fiber $a$ because the outer conductor 1' prevents light from radiating radially outward through the fiber or strip $a$. Of course, it will be appreciated that the outer conductor 1' could be apertured along its length in any desired pattern to allow light to be radiated outwardly in a radial direction from the fiber or strip $a$.

Shown at FIG. 1B is another light producing fiber or strip $a$. The light producing fiber or strip shown at FIG. 1B is the same as that shown at FIG. 1A except that in the fiber or strip $a$ of FIG. 1B a flexible transparent layer of insulating material 3 coats the outside of the second annular electrode 1'. For example, insulation material 3 may be a polypropylene resin, or the like.

In FIG. 1C the light producing fiber or strip $a$ has, as shown, a second electrode 1' which is, in cross-section, semi-circular. Accordingly, light emanating from the fiber or strip $a$ can radiate through the cross-sectional end thereof and, in addition, through half of the longitudinal peripheral surface area of the strip.

In FIG. 1D semi-circular electrode 1' is embedded within the luminescent material 2; the fluorescent material 2 being flexible.

At FIGS. 1E and 1F the light producing fiber or strip $a$ has a strip-like or belt-like cross-section. In each of these embodiments two curved electrodes 1' are spaced apart and separated by the luminescent material 2. In FIG. 1F both electrodes 1', 1' are embedded within the luminescent material. In the embodiments shown at FIGS. 1E and 1F it will be appreciated that light radiates outwardly from the fibers, or strips, a from the opposing side portions which are not covered by the electrodes 1'.

In the embodiment shown in FIG. 1G, two electrodes 1, 1 are embedded in a strip-like or belt-like mass of flexible luminescent material 2. In this embodiment light will radiate outwardly from the strip through substantially all surfaces thereof.

In the embodiment shown in FIG. 1H, there is embedded within a flexible luminescent material a first filamentary flexible electrode 1 and a thin second flexible electrode 1'. In this embodiment the second electrode 1' is a thin leaf-like element.

In FIG. 7 there is shown a light producing fiber $a'$ having a single, thin, flexible leaf-like electrode 1' embedded in a flexible dielectric luminescent material 2.

From the foregoing it will be appreciated that the light producing fibers or strips $a, a'$ may be fashioned in a variety of geometric cross-sectional and longitudinal shapes; the electrodes can have any of a variety of shapes and arrangements.

Shown at FIG. 2 in plan view, and partly sectioned for purposes of clarity, is a large-area light source grid or mat which is in the form of a woven fabric; the fabric being woven from individual light producing fibers, or strips, $a$. For example, in the sectional view shown at FIG. 3 light producing fibers or strips $a$ such as that shown at FIG. 1A are used. Alternatively, according to another embodiment as illustrated in cross-section at FIG. 4, light producing fibers or strips $a$ such as that shown at FIG. 1C are used. As shown at FIG. 2, two sets of fibers $a$ and $b$ are woven like a textile fabric. The fibers $b$ may be identical to the fibers $a$ or may comprise any of the modified versions of the fibers $a$ as indicated in FIGS. 1A to 1F or FIG. 7. After weaving, the fabric is dipped in a solution of transparent flexible insulation material, such as for example a polypropylene resin, or the like. When the solution hardens each fiber or strip $a$ and $b$ will have an external transparent flexible coating 3. In addition, the coating 3 serves to bond each fiber $a$ and $b$ together at the cross points thereof.

As an alternative to dipping the woven fabric into the transparent insulation material, each fiber or strip $a, b$ could be sprayed with the solution.

As illustrated at FIGS. 2, 3 and 4, two insulated main conductors 4 and 5 are provided, the conductors 4 and 5 are each connected to different electrical potentials from a source (not shown); the potential difference applying an electric field to the luminescent materials 2 to cause light to be generated thereby.

As may be appreciated from the cross-sectional view of the embodiments shown at FIGS. 3 and 4, the electrodes 1 of every fiber $a, b$ is connected to the main conductor 4. The main conductor 5 is connected to the electrodes 1' of the fibers $a$ and $b$. The electric potentials to be applied can be varied according to the desired light radiation intensity. For more intense radiation, the potential can be increased and/or the frequency of the electrical potential can be increased.

Thus, the large area light source woven into a fabric as shown at FIG. 2 can advantageously assume any desired shape or configuration. It may easily be bent. In addition, it is easily cut to provide any desired pattern.

Shown at FIGS. 5 and 6 is another large area light source which is in the form of a cross point array of light producing strips $a'$ (FIG. 7). As shown at FIG. 5, two orthogonally arranged sets of light producing fibers $a'$ may be dipped or sprayed with a transparent flexible insulating compound 3. The cross-sectional view shown at FIG. 6 shows the relative cross point arrangement of the fibers $a'$. As indicated at FIG. 5, the electrodes 1' of all light-producing strips $a'$ are coupled to a source of potential, not shown. The vertically arranged electrodes 1' and the horizontally arranged electrodes 1' being connected across a difference of potential, the source of which is not shown in the drawing figures.

While specific embodiments of the invention have been shown and described in detail to illustrate the application of the inventive principles, it will be understood that the invention may be embodied otherwise without departing from such principles.

What is claimed is:

1. A light source fabric comprising a grid woven from a plurality of light-producing fibers; each light-producing fiber comprising an elongated strip of dielectric material which is flexible and luminescent; and, at least two electrodes embedded in said material.

2. A light source fabric comprising a mat prepared from light-producing fibers, each said fiber comprising a luminescent material in granular form embedded in a matrix of flexible transparent insulating material; each fiber including at least two electrodes embedded in said luminescent material.

3. A light source comprising a plurality of light producing fibers arranged in a cross point array, each said fiber including at least two electrode means embedded in a flexible luminescent material, all said fibers being coated with a transparent flexible dielectric material.

4. A light source fabric comprising a plurality of light producing fibers arranged in crossing relationship; and means for electrically exciting said fibers to produce visible light including two electrodes in at least some of said fibers.

5. A light producing formation comprising a fabric formed with a first group of a plurality of fibers each including at least two electrodes and an electro-luminescent material encompassing at least a portion of said electrodes and a second group of a plurality of fibers similar to the first group disposed across said first group.

6. A light producing formation comprising a fabric formed with a first group of a plurality of fibers each including at least two electrodes and an electro-luminescent material encompassing at least a portion of said electrodes and a second group of a plurality of fibers similar to the first group disposed across said first group, and interconnected therewith.

7. A light producing formation comprising a first group of a plurality of fibers each including at least two electrodes and one electro-luminescent material encompassing at least a portion of said electrodes and a second group of a plurality of fibers similar to the first group disposed across said first group and woven over and under alternate ones thereof.

8. A light producing formation comprising a fabric formed with a first group of a plurality of fibers each including at least two electrodes and an electro-luminescent material encompassing at least a portion of said electrodes and a second group of a plurality of fibers similar to the first group disposed across said first group, and resin means covering the fibers of each of said groups and bonding said groups together.

References Cited by the Examiner

UNITED STATES PATENTS

| | | | |
|---|---|---|---|
| 2,416,056 | 2/1947 | Kalmann | 313—92.5 |
| 2,645,721 | 7/1953 | Williams | 313—65 X |
| 2,918,594 | 12/1959 | Fridrich | 313—108.1 |
| 2,976,446 | 3/1961 | Meloon et al. | 313—108.1 |
| 3,052,812 | 9/1962 | Dow | 313—108.1 |
| 3,069,579 | 12/1962 | Berg et al. | 313—108.1 |

JAMES W. LAWRENCE, *Primary Examiner.*

GEORGE N. WESTBY, *Examiner.*

R. L. JUDD, *Assistant Examiner.*